(12) United States Patent
Ahn et al.

(10) Patent No.: US 11,041,105 B1
(45) Date of Patent: Jun. 22, 2021

(54) COMPOSITION COMPRISING BRANCHED POLYGLYCEROL FOR CONTROLLING FREEZING

(71) Applicants: Korea University Research and Business Foundation, Seoul (KR); INDUSTRY-ACADEMIC COOPERATION FOUNDATION, YONSEI UNIVERSITY, Seoul (KR)

(72) Inventors: Dong June Ahn, Seoul (KR); Byeong Su Kim, Seoul (KR); Sang Yup Lee, Seoul (KR); Woo Hyuk Jung, Seoul (KR); Min Seong Kim, Seoul (KR); Young Joo Hong, Seoul (KR)

(73) Assignees: KOREA UNIVERSITY RESEARCH AND, Seoul (KR); BUSINESS FOUNDATION (MT); Please check the appropriate assignee category or categories (will not be printed on the pate, Seoul (KR); INDUSTRY-ACADEMIC COOPERATION, Seoul (KR); FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 16/702,042

(22) Filed: Dec. 3, 2019

(30) Foreign Application Priority Data

Dec. 3, 2019 (KR) .......................... 10-2019-0159396

(51) Int. Cl.
*C09K 5/20* (2006.01)
*C08G 65/34* (2006.01)

(52) U.S. Cl.
CPC ................ *C09K 5/20* (2013.01); *C08G 65/34* (2013.01); *C08G 2650/22* (2013.01); *C08G 2650/32* (2013.01); *C08G 2650/38* (2013.01); *C08G 2650/54* (2013.01)

(58) Field of Classification Search
CPC ...... C09K 5/20; C08G 65/34; C08G 2650/22; C08G 2650/32; C08G 2650/38; C08G 2650/54
See application file for complete search history.

(56) References Cited

U.S. PATENT DOCUMENTS 8,703,684 B2 * 4/2014 Kakuchi .............. C10M 173/02
508/579

FOREIGN PATENT DOCUMENTS

KR 10-141367 B1 7/2014

* cited by examiner

*Primary Examiner* — Anthony J Green
(74) *Attorney, Agent, or Firm* — Sughrue Mion, PLLC

(57) ABSTRACT

The present invention provides a composition comprising branched polyglycerol for controlling freezing, more specifically, the composition has a number average molecular weight of 1,000 to 20,000 g/mol and a branching of 0.1 to 1, and may control enhancement or inhibition of ice recrystallization by adjusting a content of polyglycerol.

11 Claims, 9 Drawing Sheets

[FIG. 1]
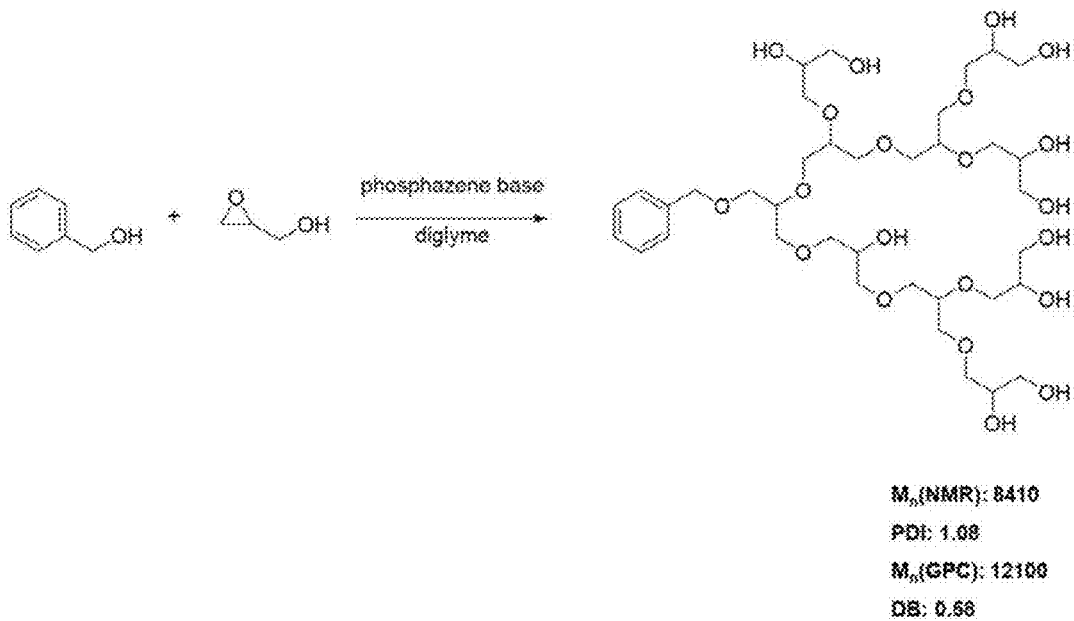
[FIG. 2]
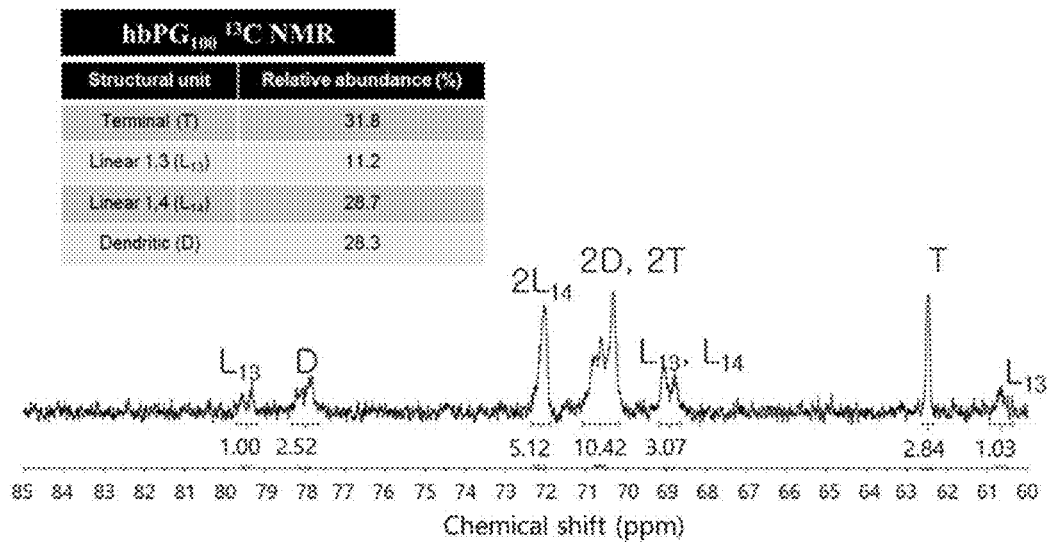

[FIG. 3]
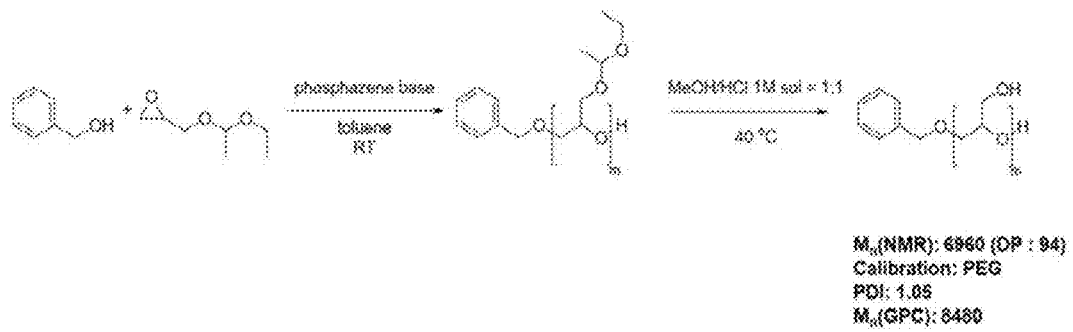
[FIG. 4]
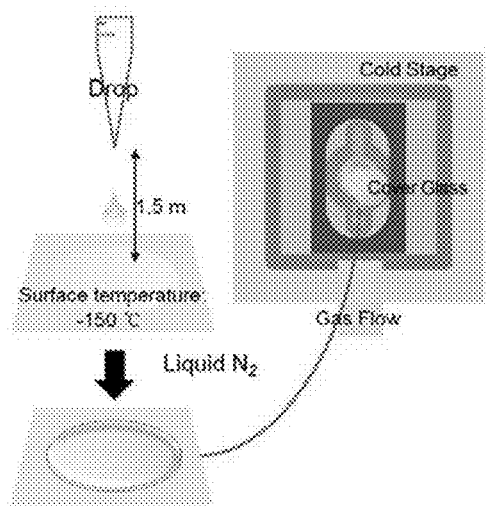
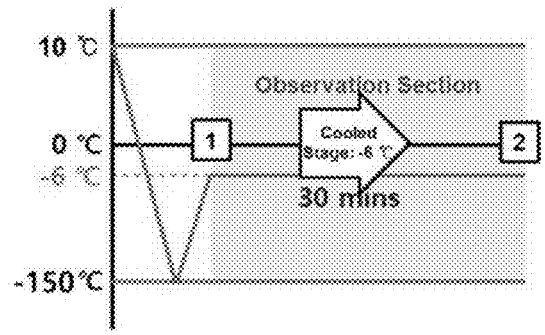
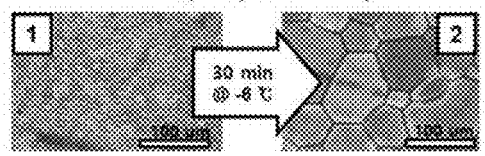
[FIG. 5]
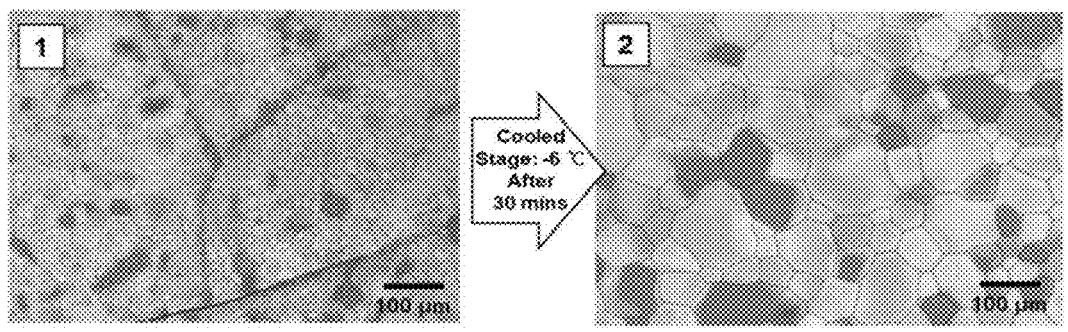

[FIG. 6]
0.0001 mM Hyperbranched Polyglycerol / Bright Field (BF)
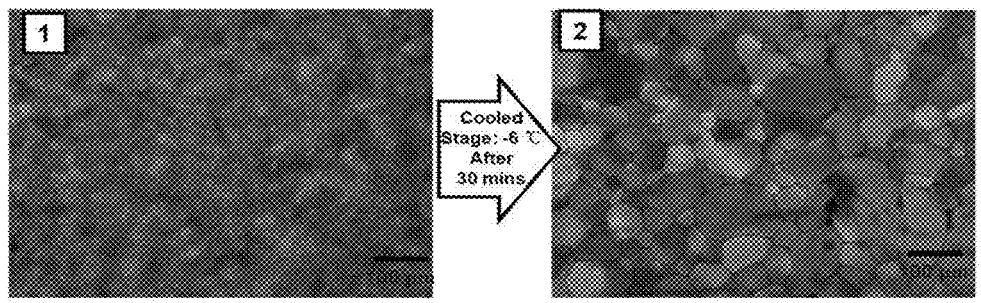
0.001 mM Hyperbranched Polyglycerol / Bright Field (BF)
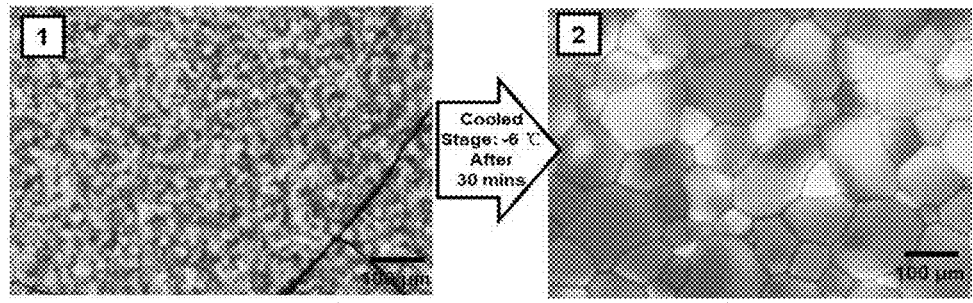

[FIG. 7]
0.01mM Hyperbranched Polyglycerol / Bright Field (BF)
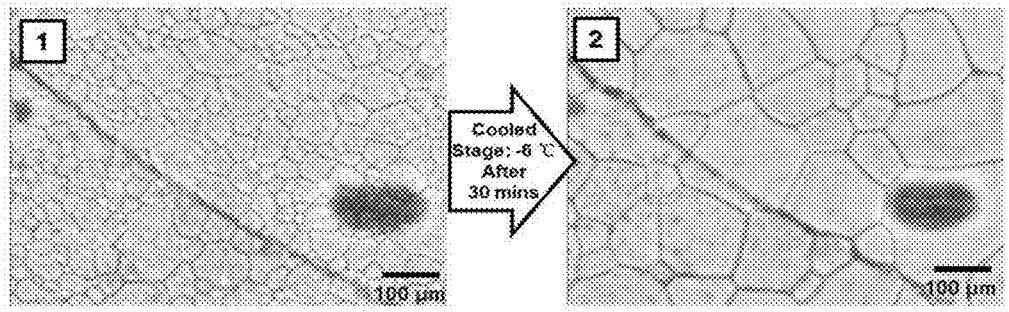
0.10mM Hyperbranched Polyglycerol / Bright Field (BF)
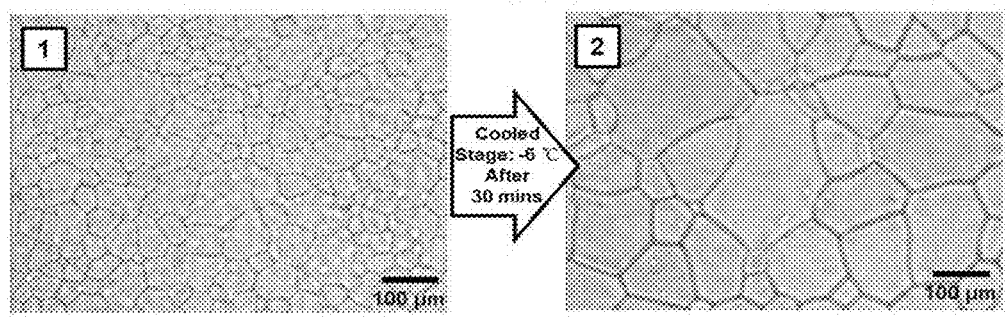

[FIG. 8]
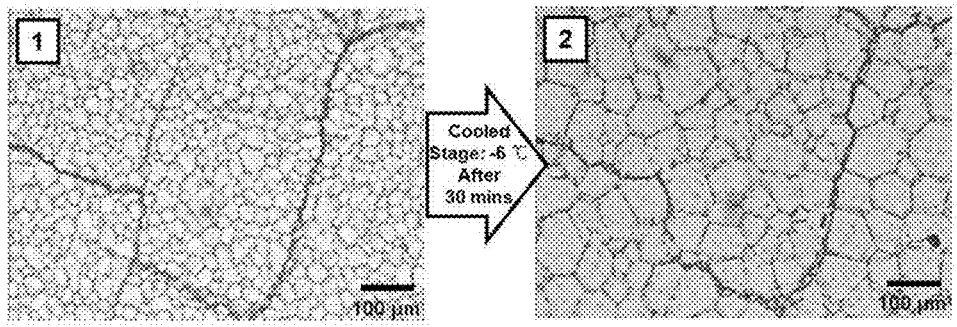
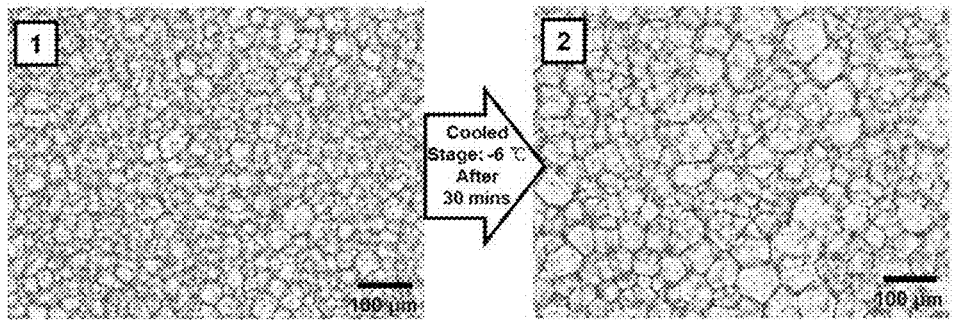

[FIG. 9]
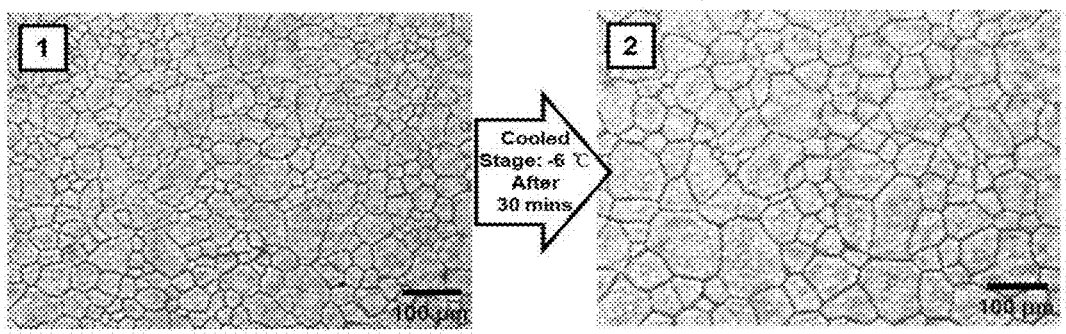
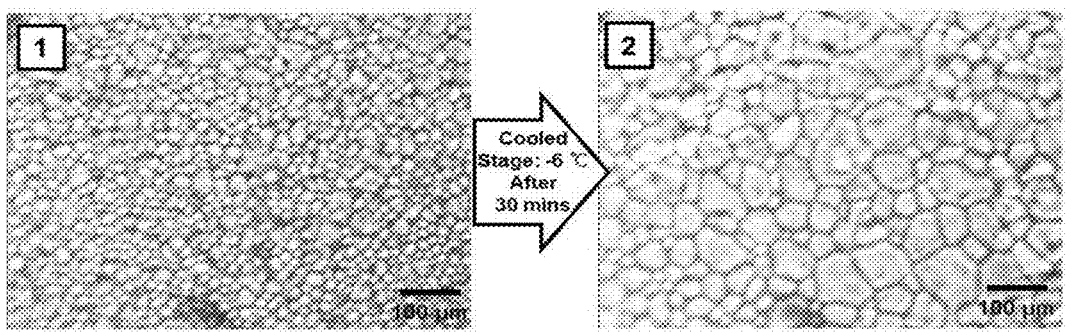

[FIG. 10]
1.23mM Linear Polyglycerol / Bright Field (BF)
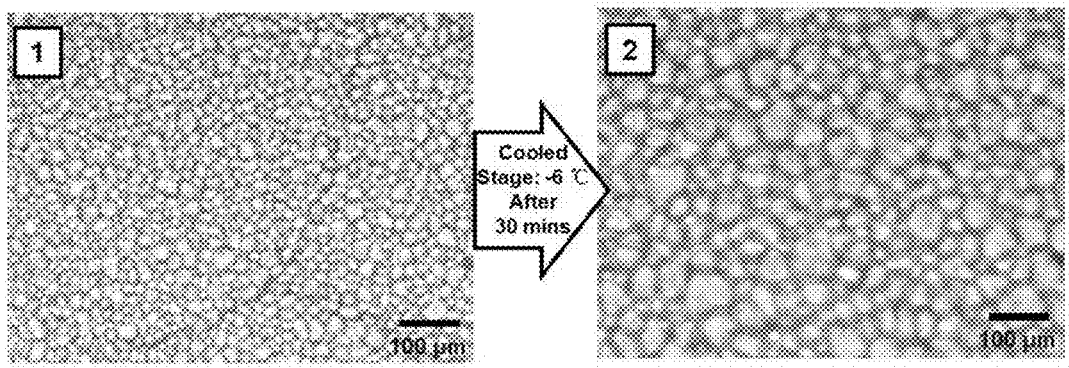
4.12mM Linear Polyglycerol / Bright Field (BF)
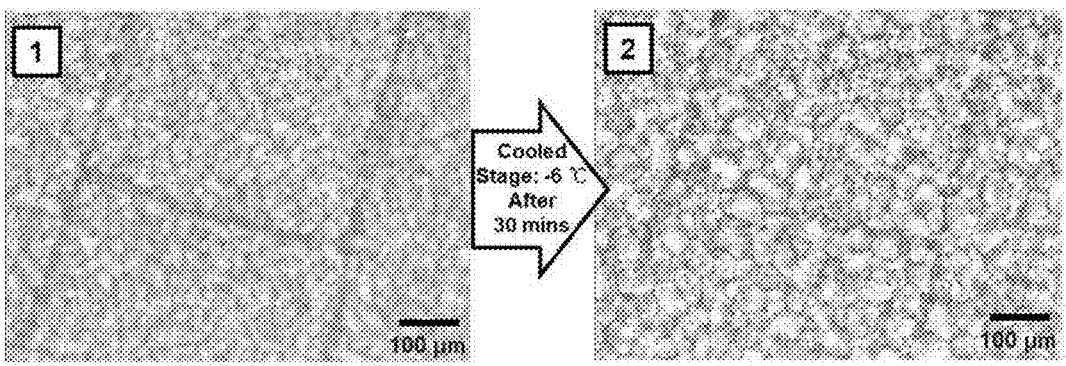

[FIG. 11]
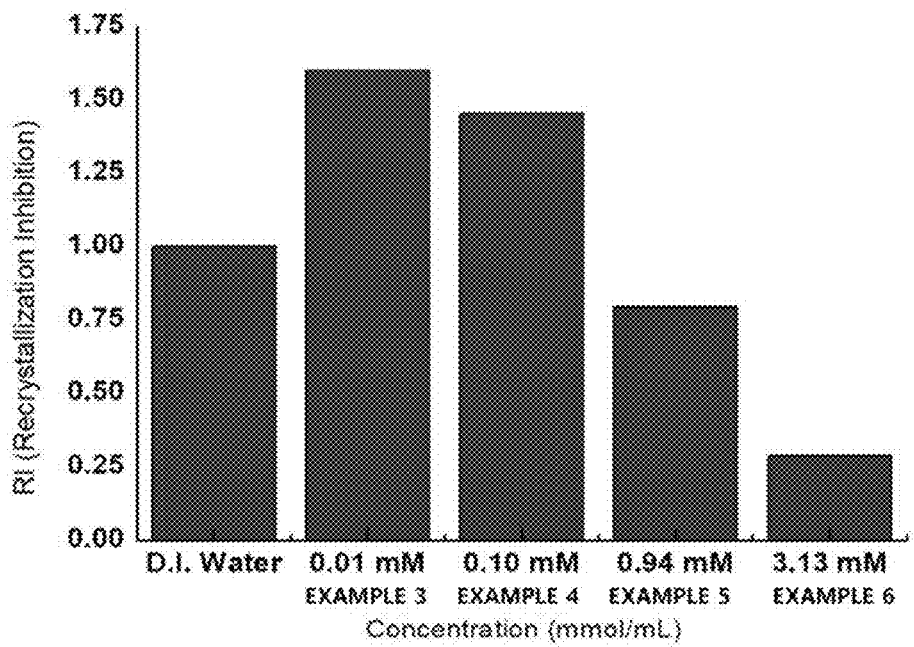
[FIG. 12]
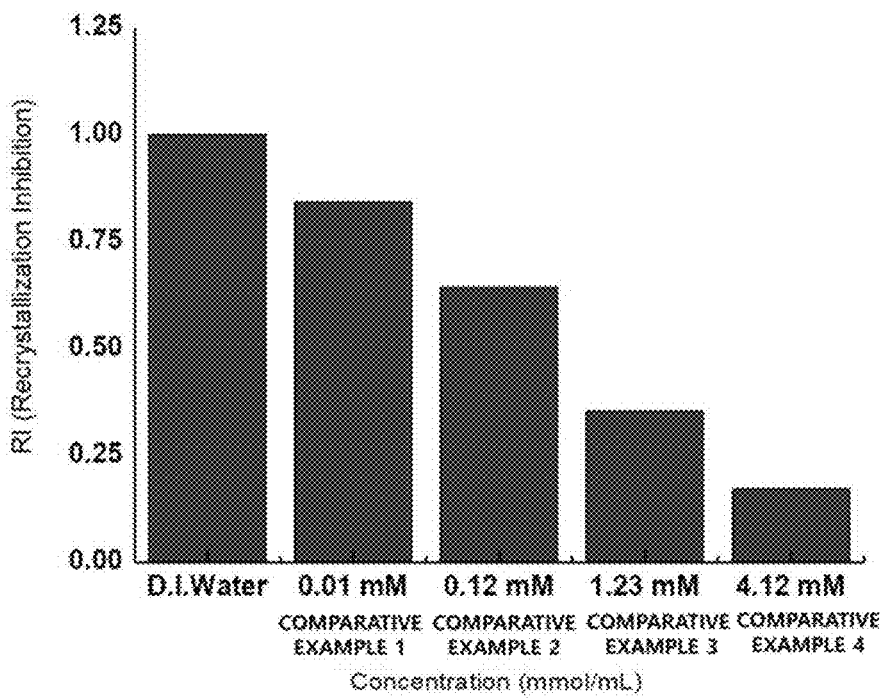

[FIG. 13]
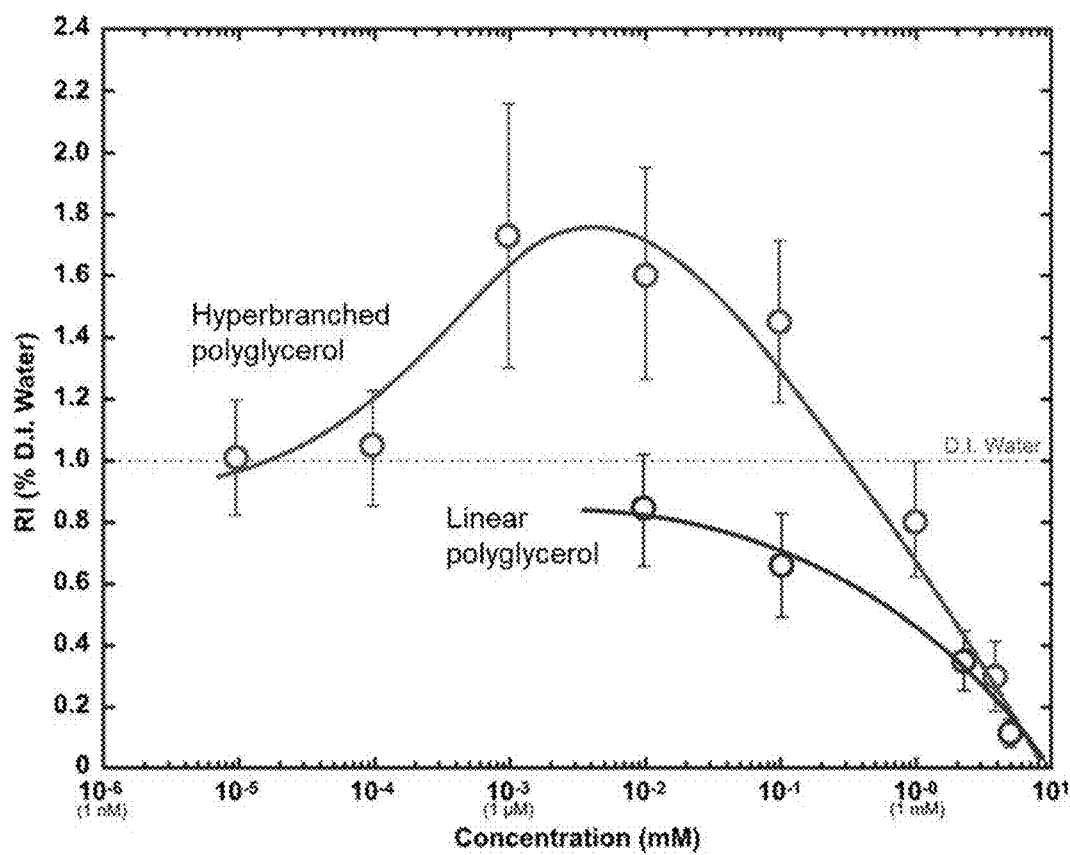

COMPOSITION COMPRISING BRANCHED POLYGLYCEROL FOR CONTROLLING FREEZING

BACKGROUND OF THE INVENTION

1. Field of the Invention

The present invention relates to a composition for controlling freezing and a method for controlling freezing.

2. Description of the Related Art

When ice crystals made through recrystallization grow a certain size or more, they may damage a frozen sample. For example, when preserving all cells such as various bacteria, yeast, platelets, red blood cells, eggs, sperms, and embryos for a long time, the cells may be destroyed by ice recrystallization, and in a case of frozen foods, taste or shape may be changed by ice recrystallization. In a sample storage industry that requires a low temperature environment, various attempts have been made to prevent a damage due to the ice recrystallization. Accordingly, there is a need to develop a material capable of more effectively controlling ice freezing without a problem.

PRIOR ART DOCUMENT

Patent Document

Korean Patent Registration No. 1417367

SUMMARY OF THE INVENTION

An object of the present invention is to provide a composition for controlling freezing.

In addition, another object of the present invention is to provide a method for controlling freezing.

To achieve the above objects, the following technical solutions are adopted in the present invention.

1. A composition for controlling freezing comprising: polyglycerol which has a structure of Formula 1 below, and has a number average molecular weight of 1,000 to 20,000 g/mol and a degree of branching of 0.1 to 1 defined by Equation 1 below:

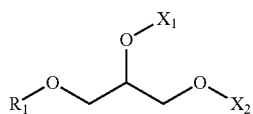

[Formula 1]

In Formula 1,
$R_1$ is benzyl, aryl or alkyl,
$X_1$ and $X_2$ are each independently H or

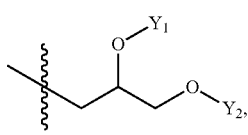

and
$Y_1$ and $Y_2$ are each independently H or

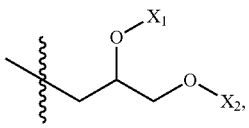

$DB=2D/(2D+L_{13}+L_{14})$. [Equation 1]

2. The composition for controlling freezing according to the above 1, wherein the number average molecular weight of the polyglycerol is 7,000 to 9,000 g/mol.

3. The composition for controlling freezing according to the above 1, wherein the degree of branching of the polyglycerol is 0.5 to 0.6.

4. The composition for controlling freezing according to the above 1, wherein the polyglycerol is included in a concentration of 0.001 to 0.1 mM based on a total composition.

5. The composition for controlling freezing according to the above 1, wherein the polyglycerol is included in a concentration of 0.8 to 5 mM based on the total composition.

6. The composition for controlling freezing according to the above 1, wherein the polyglycerol is polymerized from a glycidol monomer using benzyl alcohol as a polymerization initiator.

7. The composition for controlling freezing according to the above 1, wherein the composition is for controlling freezing of at least one of foods, drugs, pigments, agrochemicals and biological materials.

8. A method for controlling freezing, including:
adding the composition according to any one of the above 1 to 7 to a sample to be freezing controlled; and distributing the polyglycerol comprised in the composition to the sample.

9. The method for controlling freezing according to the above 8, wherein the sample is at least one of foods, drugs, pigments, agrochemicals and biological materials.

The composition of the present invention may control enhancement or inhibition of ice recrystallization by adjusting a concentration of polyglycerol comprised in the composition.

For example, by adding a composition comprising polyglycerol in a specific concentration range to a sample such as a cell culture liquid or frozen foods to inhibit ice recrystallization, it is possible to inhibit modification of cells or foods.

In addition, for example, by adding the composition comprising polyglycerol in a concentration range different from that described above to a sample comprising cancer cells, etc. to enhance ice recrystallization, a size of the ice crystals in the sample may be increased, and apoptosis of cancer cells may be induced by ice crystals having an increased size.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram illustrating a method for synthesizing branched polyglycerol;

FIG. 2 is a diagram illustrating properties of branched polyglycerol identified using carbon nuclear magnetic resonance spectroscopy;

FIG. 3 is a diagram illustrating a method for synthesizing linear polyglycerol;

FIG. 4 is a schematic diagram illustrating a splat method for measuring an effect of inhibiting ice recrystallization;

FIG. 5 is photographs illustrating a change in an ice crystal size of pure water without polyglycerol after 30 minutes elapses on a cold stage;

FIG. 6 is photographs illustrating changes in the ice crystal size of samples containing 0.0001 mM and 0.001 mM of branched polyglycerols, respectively, after 30 minutes elapses on the cold stage;

FIG. 7 is photographs illustrating changes in the ice crystal size of samples containing 0.01 mM and 0.10 mM of branched polyglycerols, respectively, after 30 minutes elapses on the cold stage;

FIG. 8 is photographs illustrating changes in the ice crystal size of samples containing 0.94 mM and 3.13 mM branched polyglycerols, respectively, after 30 minutes elapses on the cold stage;

FIG. 9 is photographs illustrating changes in the ice crystal size of samples containing 0.01 mM and 0.12 mM of linear polyglycerols, respectively, after 30 minutes elapses on the cold stage;

FIG. 10 is photographs illustrating changes in the ice crystal size of samples containing 1.23 mM and 4.12 mM of linear polyglycerols, respectively, after 30 minutes elapses on the cold stage;

FIG. 11 is a graph illustrating RI values of examples including branched polyglycerol;

FIG. 12 is a graph illustrating RI values of comparative examples including linear polyglycerol; and FIG. 13 is a graph illustrating RI values according to concentrations of the branched polyglycerol and linear polyglycerol.

DETAILED DESCRIPTION OF THE INVENTION

The present invention provides a composition comprising branched polyglycerol for controlling freezing.

As used herein, the term "branched polymer" refers to a polymer in which constant unit structures having a branch shape repeatedly extend from a center thereof, and it includes a multi-branched polymer having a branch structure in a repeating unit. A typical polymer has a string shape, whereas the branched polymer has a unique structure including a plurality of branches, and can maintain many functional groups on a surface thereof, thereby enabling various applications. The branched polymer may be synthesized by copolymerization or self-condensation of monomers having a form of AB, $AB_2$, or $AB_x$, and also may be synthesized by polymerization of monomers having a polymerization initiator as well as other functional groups.

As used herein, the term "branched polyglycerol" may refer to a polymer composed of a polyether main chain, a polyether branched chain and a plurality of hydroxyl groups.

As used herein, the term "freezing control" refers to controlling enhancement or inhibition of ice recrystallization. The term "freezing control" and "freeze control" are used interchangeably with each other.

As used herein, the term "ice recrystallization (IR)" refers to a process in which small ice crystals grow into large ice crystals, and may be performed in a dissolution-diffusion-refreezing or a sublimation-diffusion-condensation mechanism. The ice recrystallization repeatedly occurs due to cooling conditions in a partly frozen environment or a fluctuation in a temperature of the frozen material. The IR is one of major causes of soft texture loss and quality degradation during storage of frozen foods such as ice cream. Further, in cryopreservation, recrystallization of ice during thawing causes a damage in a cell membrane and leads to cell dehydration, thereby damaging cells and tissues.

Branched polyglycerol may have a structure of Formula 1 below:

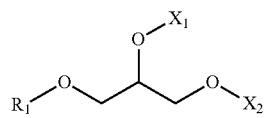
[Formula 1]

In Formula 1, $R_1$ is benzyl, aryl or alkyl, $X_1$ and $X_2$ are each independently H or

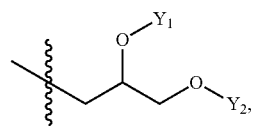

and $Y_1$ and $Y_2$ are each independently H or

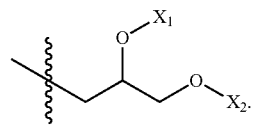

As used herein, the term "alkyl" is a straight or branched chain, or cyclic saturated hydrocarbon unless stated otherwise herein, and may be C1 to C6 substituted or unsubstituted, straight or branched chain, or cyclic saturated hydrocarbon.

Branched polyglycerol may be a polymer from which repeating units having a structure of Formula 2 below repeatedly extend:

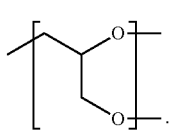
[Formula 2]

Branched polyglycerol according to one embodiment may have a structure of Formula 3 below:
[Formula 3]
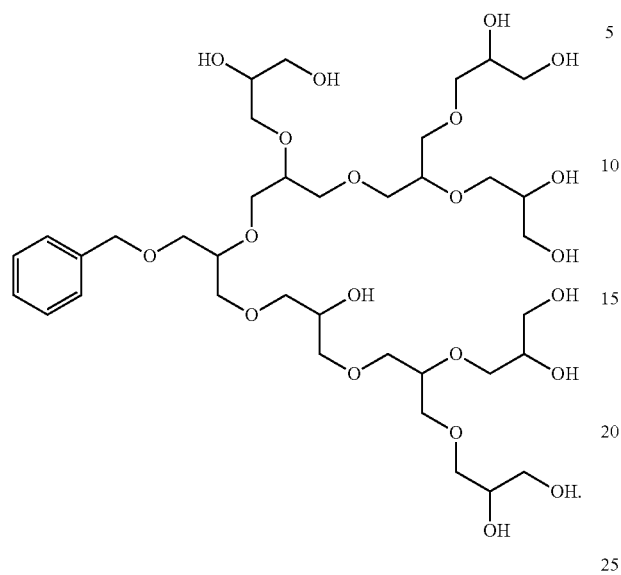
Branched polyglycerol according to one embodiment may have a structure of Formula 4 below:
[Formula 4]
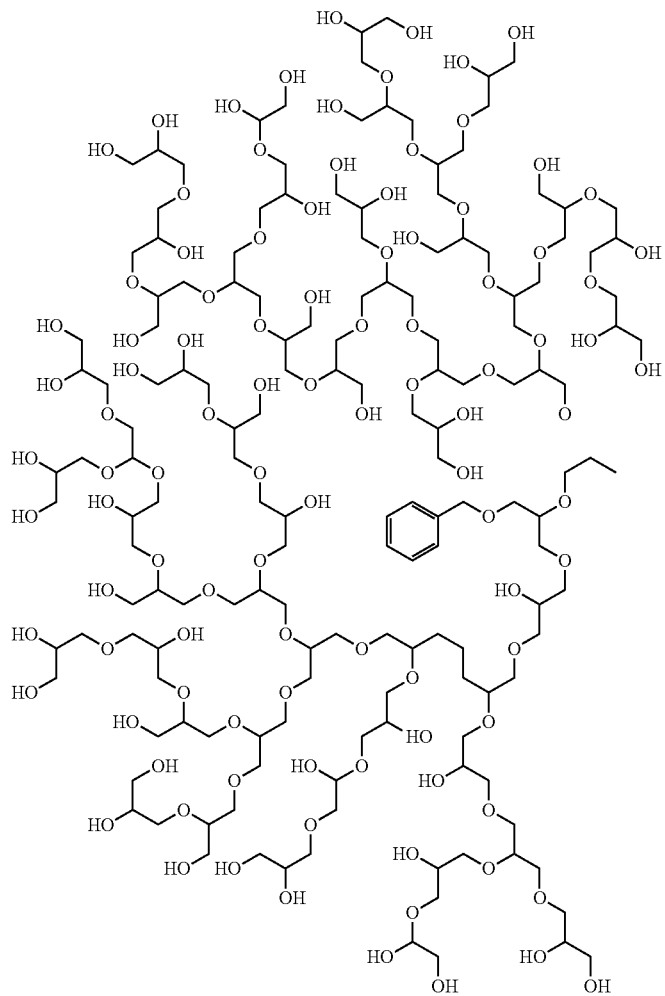

-continued

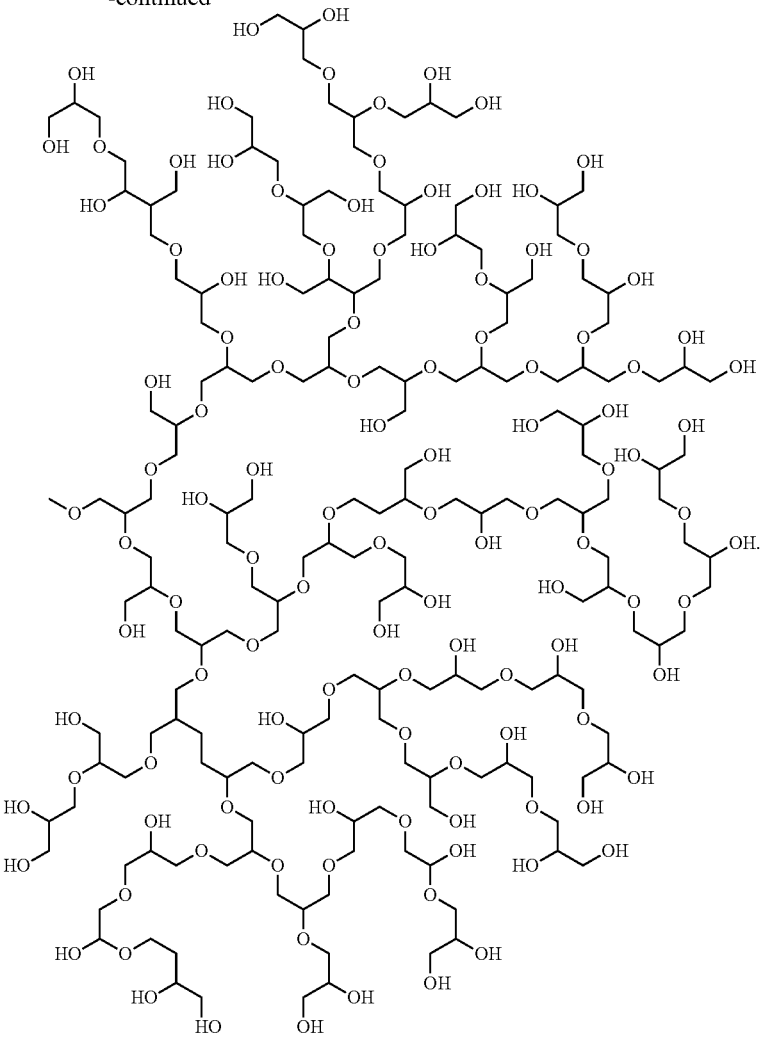

Branched polyglycerol according to one embodiment may have a structure of Formula 5 below:

[Formula 5]

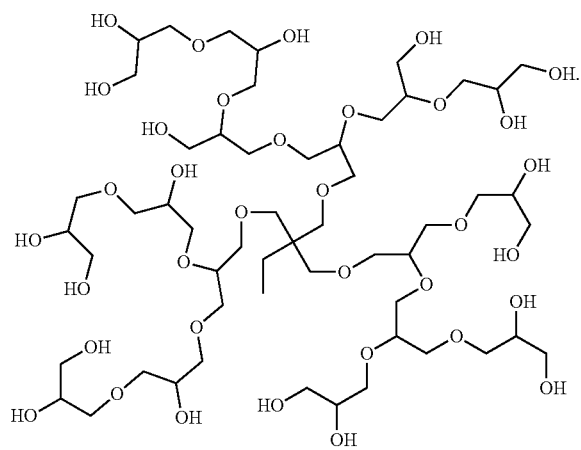

Branched polyglycerol may be polymerized by including glycidol or a monomer of a derivative thereof.

Branched polyglycerol may be prepared using a compound having a hydroxyl group as a polymerization initiator.

The polymerization initiator may be a compound having a hydroxyl group.

The polymerization initiator may be one selected from the group consisting of benzyl alcohol, 2-ethyl-2-(hydroxymethyl) propane-1,3-diol, ethyl alcohol, propyl alcohol, butyl alcohol and pentyl alcohol.

A number average molecular weight of the branched polyglycerol may range from 1,000 to 20,000 g/mol, 2,000 to 19,000 g/mol, 3,000 to 18,000 g/mol, 4,000 to 17,000 g/mol, 5,000 to 16,000 g/mol, 6,000 to 15,000 g/mol, 7,000 to 14,000 g/mol, 8,000 to 13,000 g/mol, 9,000 to 12,000 g/mol or 10,000 to 11,000 g/mol.

The number average molecular weight of the branched polyglycerol may range from 1,000 to 15,000 g/mol, 2,000 to 14,000 g/mol, 3,000 to 13,000 g/mol, 4,000 to 12,000 g/mol, 5,000 to 11,000 g/mol, 6,000 to 10,000 g/mol or 7,000 to 9,000 g/mol.

A degree of branching of the branched polyglycerol may be 0.1 to 1, 0.2 to 0.9 0.25 to 0.85, 0.3 to 0.8, 0.35 to 0.75, 0.4 to 0.7, 0.45 to 0.65 or 0.5 to 0.6.

The degree of branching (DB) is defined by Equation 1 below:

$$DB=2D/(2D+L_{13}+L_{14}),$$ [Equation 1]

In Equation 1, D denotes a relative integration ratio for $^{13}$C-NMR peaks of a dendritic monomer, $L_{13}$ denotes a relative integration ratio for $^{13}$C-NMR peaks of a linear 1,3-monomer, and $L_{14}$ denotes a relative integration ratio for $^{14}$C-NMR peaks of a linear 1,4-monomer.

A polydispersity index (PDI) of the branched polyglycerol may be 0.2 to 1.8, 0.3 to 1.7, 0.4 to 1.6, 0.5 to 1.5, 0.6 to 1.4, 0.7 to 1.3, 0.8 to 1.2 or 0.9 to 1.1.

As used herein, the term "PDI" also referred to a degree of dispersion, and is defined as a ratio ($M_w/M_n$) of weight average molecular weight ($M_w$) to number average molecular weight ($M_n$). The PDI may be a criterion for indicating an extent (size) of the molecular weight distribution. In general, the larger the PDI, the wider the molecular weight distribution, thereby tending to be unstable, and the lower the PDI, the narrower and more uniform the molecular weight distribution, thereby being regarded to be stable.

A composition comprising branched polyglycerol of the invention may exhibit an effect of controlling freezing.

The composition of the present invention may exhibit an effect of controlling the enhancement or inhibition of ice recrystallization, and specifically, may enhance or inhibit the ice recrystallization by adjusting a content of the branched polyglycerol based on a total composition.

The extent of ice recrystallization enhancement or inhibition by the composition of the present invention may be determined by a recrystallization inhibition (RI) value calculated by Equation 2 below:

RI=(Average area of top ten ice domains of composition to which branched polyglycerol is added to purified water)/(Average area of top ten ice domains of purified water). [Equation 2]

According to one embodiment, a composition comprising 0.001 to 0.1 mM, 0.002 to 0.1 mM, 0.003 to 0.1 mM, 0.004 to 0.1 mM, 0.005 to 0.1 mM, 0.006 to 0.1 mM, 0.007 to 0.1 mM, 0.008 to 0.1 mM, 0.009 to 0.1 mM or 0.01 to 0.1 mM of branched polyglycerol based on the total composition may exhibit an effect of enhancing ice recrystallization.

The RI value of a composition comprising 0.001 to 0.1 mM of branched polyglycerol based on the total composition may be greater than 1, and may be, for example, 1.3 to 2.0, 1.4 to 1.9, 1.5 to 1.8 or 1.6 to 1.7.

According to one embodiment, a composition comprising 0.8 mM or more, 0.9 mM or more, 1.0 mM or more, 2.0 mM or more, 3.0 mM or more, 4.0 mM, or 5.0 mM or more of branched polyglycerol based on the total composition may exhibit an effect of inhibiting ice recrystallization.

In addition, according to one example, a composition comprising 0.8 to 5 mM, 0.9 to 4.5 mM, 0.9 to 4 mM, 0.9 to 3.5 mM or 0.9 to 3 mM of branched polyglycerol based on the total the composition may exhibit the effect of inhibiting ice recrystallization.

The RI value of a composition comprising 0.8 mM or more, or 0.8 to 5 mM of branched polyglycerol based on the total composition may be less than 1, and may be, for example, 0.8 or less, 0.7 or less, 0.6 or less, 0.5 or less, 0.4 or less, 0.3 or less, 0.2 or less, or 0.1 or less.

The composition comprising branched polyglycerol of the present invention may be a composition for controlling freezing of at least one of foods, drugs, pigments, agrochemicals and biological materials.

The biological material may be prokaryotic cells, eukaryotic cells, microorganisms, animal cells, cancer cells, sperms, eggs, stem cells including adult stem cells, embryonic stem cells, and dedifferentiated stem cells, blood cells including cord blood, white blood cells, red blood cells, and platelets, and tissue cells including kidney cells, liver cells, and muscle cells, organs, or tissues.

The food may be a frozen food, and the frozen food may mean a food in which storage at a low temperature is essential, such as ice cream, frozen fruit, frozen meat and the like.

The composition comprising branched polyglycerol in an amount capable of exhibiting an effect of enhancing ice recrystallization may be used for treating cancer cells to induce apoptosis of the cancer cells.

The composition comprising branched polyglycerol in an amount capable of exhibiting an effect of inhibiting ice recrystallization may be added to frozen foods to prevent an increase in an ice size of the frozen foods and ultimately maintain a shape or taste of the foods.

As described above, the inventive composition has an advantage that can be used for various purposes to enhance or inhibit the ice recrystallization by adjusting only a content ratio of the branched polyglycerol.

In addition, the present invention also provides a method for controlling freezing comprising the steps of: adding a composition comprising branched polyglycerol to a sample to be freezing controlled, and distributing the polyglycerol comprised in the composition to the sample.

Since the composition and the sample comprising branched polyglycerol have been described above, therefore will not be described in detail.

The method for controlling freezing may be a method for increasing freezing of a sample by adding the composition comprising branched polyglycerol to the sample to enhance ice recrystallization, or a method for inhibiting freezing of the sample by adding the composition comprising branched polyglycerol to the sample to inhibit ice recrystallization.

For example, by adding a composition comprising 0.8 mM or more of branched polyglycerol to frozen desserts such as ice cream, frozen yogurt, ice blend, and slurry, it is possible to finely maintain an ice crystal structure of the frozen desserts, thus to improve the taste and quality of the frozen desserts.

For example, by adding a composition comprising 0.001 to 0.1 mM of branched polyglycerol to a culture liquid of cells (e.g., cancer cells), etc. to be induced a variation, it is possible to increase ice recrystallization, and thereby causing a disruption of a structure of the cells.

Hereinafter, the present invention will be described in detail with reference to examples.

Preparation of Branched Polyglycerol

Preparative Example 1

Benzyl alcohol (20.78 μL, 0.2 mmol, 1 equivalent) was dissolved in 6.67 mL of diglyme, followed by adding a phosphazene base solution (t-BuP$_4$ 0.8 M hexane solution) (236 μL, 0.2 mmol, 1 equivalent), and then the mixture was heated to 80° C. Thereafter, glycidol (1.33 mL, 20 mmol, 100 equivalents) was added dropwise for 12 hours, followed by additionally reacting for 12 hours. After cooling the mixture to room temperature, methanol was added to end the reaction. The polymer solution was dialyzed for 3 days using a 3000 Da dialysis membrane to remove the remaining phosphazene base and diglyme. Benzyl alcohol, diglyme, and glycidol were distilled off and placed in a 4 Å molecular sieve to completely remove moisture. The phosphagen base (t-BuP$_4$) purchased from Sigma Aldrich was used herein (see FIG. 1).

The degree of branching, number average molecular weight of the prepared polyglycerol was evaluated using carbon nuclear magnetic resonance spectroscopy ($^{13}$C-NMR), and the PDI was measured.

FIG. 2 illustrates results of confirming characteristics of the branched polyglycerol analyzed using the carbon nuclear magnetic resonance spectroscopy. The branch-shaped polyglycerol has a total of three carbons including: dendritic carbon (D) that participates in the reaction of both a hydroxy group and an epoxide ring; carbon ($L_{13}$) that participates in the reaction of only the epoxide ring; and carbon ($L_{14}$) in which ion transfer occurs after the epoxide ring is opened such that the existing hydroxyl group participates in the reaction. At this time, a ratio of the dendritic carbon is a measure for determining whether the prepared polymer is a branched or linear shape. The ratio can be calculated from an integral value occupied by each of carbons, which is measured using $^{13}$C NMR technique.

The degree of branching (DB) was calculated by Equation 1 below using the above values.

$$DB=2D/(2D+L_{13}+L_{14}).\qquad\text{[Equation 1]}$$

As a result of analysis, the measured molecular weight of the synthesized polyglycerol was 8,400 g/mol, and the measured PDI was 1.08, and from these values, it was confirmed that the polyglycerol was well synthesized in a uniform molecular weight. In addition, the calculated DB was 0.58, and from this value, it was confirmed that the synthesized polyglycerol had a hyperbranched shape.

Preparation of Linear Polyglycerol

1) Synthesis of Monomer (1-ethoxyethyl glycidyl ether)

10 mL (150.49 mmol, 1 equivalent) of glycidol and 43.34 mL (451.47 mmol, 3 equivalents) of ethyl vinyl ether were dissolved in 150 mL of dichloromethane, and 0.278 g (2.19 mmol, 0.01 equivalents) of para-toluenesulphonic acid was slowly added at 0° C. After completion of the injection of para-toluenesulphonic acid, the temperature was gradually raised to room temperature, followed by reacting for 6 hours. After confirming whether the reaction is completely performed by thin layer chromatography, a saturated sodium bicarbonate solution was slowly added to end the reaction. Then, a dichloromethane layer was worked up three times with 20 mL of water, and was worked up once with 60 mL of saturated sodium chloride solution. After recovering an organic layer to remove residual moisture using sodium sulfate, all solvent was removed by a rotary evaporator-concentrator. The resulting product was distilled off to recover the monomer, and stored in a 4 Å molecular sieve.

2) Preparation of Linear Polyglycerol

Benzyl alcohol (20.78 μL, 0.2 mmol, 1 equivalent) was dissolved in 5.8 mL of toluene, and then a phosphazene base solution (t-BuP$_4$ 0.8 M hexane solution) (236 μL, 0.2 mmol, 1 equivalent) was added to activate an initiator. Thereafter, 1-ethoxyethyl glycidyl ether (2.92 g, 20 mmol, 100 equivalents) was injected, followed by reacting at room temperature for 6 hours. A small amount of benzoic acid was added to end the reaction. Then, the reaction mixture was diluted in tetrahydrofuran and passed through alumina oxide to remove benzoic acid and phosphazene base. The mixture was passed through a syringe filter to remove residual dust or unfiltered alumina oxide, and the solvent was blown out to recover the polymer.

1 g (0.068 mmol, 1 equivalent) of the recovered poly (1-ethoxyethyl glycidyl ether) polymer was dissolved in 1 mL of methanol, and the mixture was injected into a 10 mL of solution prepared by mixing methanol and 1 M hydrochloric acid solution in a volume ratio of 1:1. After performing a reaction at 40° C. for 2 hours, the solvent was blown out, and the mixture was precipitated twice in cold diethyl ether to recover the polymer.

Benzyl alcohol and toluene were distilled off and completely removed by putting 4 Å molecular sieve. The phosphagen base (t-BuP$_4$) purchased from Sigma Aldrich was used herein (see FIG. 3).

The measured molecular weight of the synthesized polyglycerol was 6,960 g/mol, and the measured PDI was 1.05, and from these values, it was confirmed that the polyglycerol was well synthesized with a uniform molecular weight.

Effect of Controlling Ice Recrystallization of Composition Comprising Polyglycerol In order to confirm an effect of controlling ice recrystallization according to the content of polyglycerol, compositions, in which the branched polyglycerol prepared in Preparative Example 1 are comprised in purified water in a variety of contents, were prepared (Examples 1 to 6). In addition, as a control, compositions, in which the linear polyglycerol prepared by the above-described method are comprised in purified water in a variety of contents, were prepared (Comparative Examples 1 to 4) (see Table 1 below).

TABLE 1

| Sample | Polyglycerol concentration (mM) |
| --- | --- |
| Purified water (D.I. Water) | 0 |
| Example 1 | 0.0001 |
| Example 2 | 0.001 |
| Example 3 | 0.01 |
| Example 4 | 0.10 |
| Example 5 | 0.94 |
| Example 6 | 3.13 |
| Comparative Example 1 | 0.01 |
| Comparative Example 2 | 0.12 |
| Comparative Example 3 | 1.23 |
| Comparative Example 4 | 4.12 |

Ice recrystallization inhibition (IRI) analysis was performed on each of the prepared compositions to confirm the effect of controlling ice recrystallization of polyglycerol. The IRI analysis using the prepared compositions (samples) was carried out by using a splat method.

10 μl of the sample was dropped at a height of 1.5 m and rapidly cooled on an aluminum substrate cooled to −150° C. with liquid nitrogen. The cover glass was transferred onto a cold stage maintained at −6° C. to observe ice crystals generated on the cover glass. Changes in the ice crystal size were observed on the cold stage for 30 minutes using an optical microscope (Olympus BX53 Upright Microscope) in a transmission mode, and after 30 minutes, ice crystal analysis of the samples was performed (see FIG. 4).

FIG. 5 illustrates the change in the ice crystal size of pure water without polyglycerol.

FIG. 6 illustrates the changes in the ice crystal size of a sample comprising 0.0001 mM of branched polyglycerol (Example 1) and a sample comprising 0.001 mM of branched polyglycerol (Example 2).

FIG. 7 illustrates the changes in the ice crystal size of a sample comprising 0.01 mM of branched polyglycerol (Example 3) and a sample comprising 0.10 mM of branched polyglycerol (Example 4).

FIG. 8 illustrates the changes in the ice crystal size of a sample comprising 0.94 mM of branched polyglycerol (Example 5) and a sample comprising 3.13 mM of branched polyglycerol (Example 6).

FIG. 9 illustrates the change in the ice crystal size of the sample comprising 0.01 mM of linear polyglycerol (Comparative Example 1) and a sample comprising 0.12 mM of linear polyglycerol (Comparative Example 2).

FIG. 10 illustrates the changes in the ice crystal size of a sample comprising 1.23 mM of linear polyglycerol (Comparative Example 3) and a sample comprising 4.12 mM of linear polyglycerol (Comparative Example 4).

The RI values were calculated by measuring the ice sizes of each sample observed with the optical microscope (see FIGS. 5 to 10). Specifically, the recrystallization inhibition (RI) values were calculated by obtaining an average area of the top ten ice domains of the compositions to which the branched polyglycerol was added to purified water, and comparing the obtained value with an average area of the top ten ice domains of purified water (see Equation 2 below).

RI=(Average area of top ten ice domains of composition to which branched polyglycerol is added to purified water)/(Average area of top ten ice domains of purified water).    [Equation 2]

It means that, as the RI value approaches 1, the tendency is similar to D.I. water, and the freezing control performance is decreased, and as the RI value approaches 0, the freezing control performance is excellent.

Table 2 below shows average ice domain sizes and RI values of each of Examples 1 to 6 and Comparative Examples 1 to 4.

TABLE 2

| Sample | Average area of top ten ice domains ($\mu m^2$) | RI Value |
|---|---|---|
| Purified | 10212 ± 4759 | 1.0000 |
| Example 1 | 11233 ± 4997 | 1.0999 |
| Example 2 | 17170 ± 10673 | 1.6813 |
| Example 3 | 16330 ± 8942 | 1.5990 |
| Example 4 | 14832 ± 5305 | 1.4523 |
| Example 5 | 8097 ± 2178 | 0.7928 |
| Example 6 | 2942 ± 1068 | 0.2880 |
| Comparative Example 1 | 8577 ± 1918 | 0.8398 |
| Comparative Example 2 | 6554 ± 1327 | 0.6417 |
| Comparative Example 3 | 3602 ± 814 | 0.3527 |
| Comparative Example 4 | 1739 ± 356 | 0.1703 |

FIG. 11 is a graph illustrating RI values of the examples comprising branched polyglycerols. The compositions comprising branched polyglycerol exhibited the effect of inhibiting ice recrystallization when the polyglycerol is included at a concentration of a certain value or more (Examples 5 and 6), whereas exhibited the effect of enhancing the ice recrystallization when the polyglycerol is included in a low concentration of a specific range (Examples 2 and 3).

FIG. 12 is a graph illustrating RI values of Comparative Examples including the linear polyglycerols. It was confirmed that the compositions comprising the linear polyglycerol were excellent in the effect of inhibiting ice recrystallization as the concentration of the polyglycerol is increased.

FIG. 13 is a graph illustrating RI values according to the concentration of branched polyglycerol or linear polyglycerol. As shown in FIG. 13, the linear polyglycerol has a lower RI value as the concentration is increased, whereas the branched polyglycerol has a section in which the RI value is greater than 1 in a specific concentration range. Through these results, it was confirmed that, by controlling the content of the branched polyglycerol, the ice recrystallization could be inhibited or increased.

What is claimed is:

1. A composition for controlling freezing comprising: polyglycerol which has a structure of Formula 1 below, and has a number average molecular weight of 1,000 to 20,000 g/mol and a degree of branching of 0.1 to 1 defined by Equation 1 below:

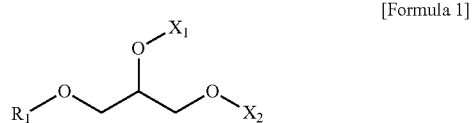

[Formula 1]

wherein in Formula 1,
$R_1$ is benzyl, aryl or alkyl,
$X_1$ and $X_2$ are each independently H or

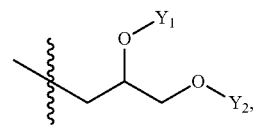

and
$Y_1$ and $Y_2$ are each independently H or

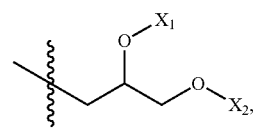

DB=$2D/(2D+L_{13}+L_{14})$,    [Equation 1]

wherein in Equation 1,
DB is a degree of branching,
D is a relative integral value for $^{13}$C-NMR peaks of a dendritic structural unit,
$L_{13}$ is a relative integral value for $^{13}$C-NMR peaks of a linear 1,3 structural unit,
$L_{14}$ is a relative integral value for $^{13}$C-NMR peaks of a linear 1,4 structural unit, and
wherein the polyglycerol is included in a concentration of 0.001 to 0.1 mM or 0.8 to 5 mM based on the total composition.

2. The composition for controlling freezing according to claim 1, wherein the number average molecular weight of the polyglycerol is 7,000 to 9,000 g/mol.

3. The composition for controlling freezing according to claim 1, wherein the degree of branching of the polyglycerol is 0.5 to 0.6.

4. The composition for controlling freezing according to claim 1, wherein the polyglycerol is polymerized from a glycidol monomer using benzyl alcohol as a polymerization initiator.

5. The composition for controlling freezing according to claim 1, wherein the composition is for controlling freezing of at least one of foods, drugs, pigments, agrochemicals and biological materials.

6. A method for controlling freezing, comprising:

adding a composition to a sample to be freezing controlled, wherein the composition comprises polyglycerol which has a structure of Formula 1 below, and has a number average molecular weight of 1,000 to 20,000 g/mol and a degree of branching of 0.1 to 1 defined by Equation 1 below:

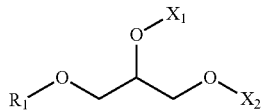

[Formula 1]

wherein in Formula 1, $R_1$ is benzyl, aryl or alkyl, $X_1$ and $X_2$ are each independently H or

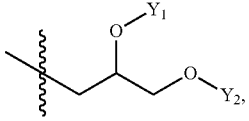

and $Y_1$ and $Y_2$ are each independently H or

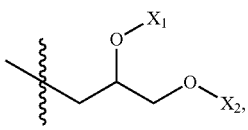

$$DB = 2D/(2D + L_{13} + L_{14})$$ [Equation 1]

wherein in Equation 1,

DB is a degree of branching,

D is a relative integral value for $^{13}$C-NMR peaks of a dendritic structural unit, $L_{13}$ is a relative integral value for $^{13}$C-NMR peaks of a linear 1,3 structural unit, $L_{14}$ is a relative integral value for $^{13}$C-NMR peaks of a linear 1,4 structural unit.

7. The method for controlling freezing according to claim 6, wherein the sample is at least one of foods, drugs, pigments, agrochemicals and biological materials.

8. A method for controlling freezing comprising:

adding a composition comprising polyglycerol to a sample, wherein the polyglycerol comprises a repeating unit derived from a glycidol and has a number average molecular weight of 1,000 g/mol to 20,000 g/mol and a degree of branching of 0.1 to 1.

9. The method for controlling freezing according to claim 8, wherein the sample is at least one of foods, drugs, pigments, agrochemicals and biological materials.

10. The method for controlling freezing according to claim 8, wherein the polyglycerol is polymerized from a glycidol monomer.

11. The method for controlling freezing according to claim 8, wherein the degree of branching of the polyglycerol is 0.5 to 0.6.

* * * * *